(12) United States Patent
Mossoba et al.

(10) Patent No.: US 11,676,140 B2
(45) Date of Patent: Jun. 13, 2023

(54) SYSTEM AND METHOD FOR FACILITATING TRANSFER OF ELECTRONIC PAYMENT INFORMATION

(71) Applicant: Capital One Services, LLC, McLean, VA (US)

(72) Inventors: Michael Mossoba, Arlington, VA (US); Joshua Edwards, Philadelphia, PA (US); Abdelkader Benkreira, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 256 days.

(21) Appl. No.: 16/904,165

(22) Filed: Jun. 17, 2020

(65) Prior Publication Data
US 2021/0398114 A1    Dec. 23, 2021

(51) Int. Cl.
*G06Q 20/38*     (2012.01)
*G06Q 20/02*     (2012.01)
(Continued)

(52) U.S. Cl.
CPC ..... *G06Q 20/3829* (2013.01); *G06F 21/6245* (2013.01); *G06Q 20/023* (2013.01);
(Continued)

(58) Field of Classification Search
CPC ... G06Q 20/00–425; G06Q 40/00–128; G06Q 2220/00–18; G05F 21/00–88; H04L 63/00–308
See application file for complete search history.

(56) References Cited

U.S. PATENT DOCUMENTS

| | | | |
|---|---|---|---|
| 5,892,900 A | * | 4/1999 | Ginter ............... G06F 21/78 726/26 |
| 6,092,053 A | | 7/2000 | Boesch et al. |

(Continued)

FOREIGN PATENT DOCUMENTS

| | | |
|---|---|---|
| AU | 1521400 A | 5/2000 |
| CA | 2404221 C | 12/2013 |

(Continued)

OTHER PUBLICATIONS

International Search Report and the Written Opinion of the International Searching Authority issued in related PCT Application No. PCT/US2021/037543 dated Oct. 6, 2021.

(Continued)

*Primary Examiner* — John W Hayes
*Assistant Examiner* — Chenyuh Kuo
(74) *Attorney, Agent, or Firm* — Hunton Andrews Kurth LLP

(57) ABSTRACT

In a method for transferring payment account information, a payment information transfer request is received from an account holder device associated with a first provider account. A list of payees to which electronic payments have been made from the first provider account is transmitted to the account holder device for display to the account holder and a user selection of at least one selected payee from the list of one or more payees is received from the account holder device. A payment account information data file is assembled in a predetermined data format, the file including payment account information for each selected payee. The payment account information data file is then transmitted to at least one of the set consisting of the account holder device and an information processing system of a second account provider.

17 Claims, 9 Drawing Sheets

(51) Int. Cl.
  *G06Q 20/12* (2012.01)
  *G06Q 20/40* (2012.01)
  *G06Q 40/02* (2023.01)
  *G06F 21/62* (2013.01)
  *H04L 9/40* (2022.01)

(52) U.S. Cl.
  CPC ......... *G06Q 20/12* (2013.01); *G06Q 20/4014* (2013.01); *G06Q 40/02* (2013.01); *H04L 63/08* (2013.01); *G06Q 2220/00* (2013.01)

(56) References Cited

U.S. PATENT DOCUMENTS

| | | | |
|---|---|---|---|
| 7,003,493 B2* | 2/2006 | Weichert | G06Q 20/00 |
| | | | 235/382 |
| 7,774,251 B1 | 8/2010 | Prasad et al. | |
| 7,822,683 B2 | 10/2010 | Jakstadt et al. | |
| 7,848,974 B1 | 12/2010 | Sheehan | |
| 8,401,938 B1 | 3/2013 | Chapman et al. | |
| 8,458,064 B1 | 6/2013 | Dobbins | |
| 8,521,645 B2 | 8/2013 | Steele et al. | |
| 9,842,367 B2* | 12/2017 | Johnston | G06Q 20/023 |
| 9,911,114 B2* | 3/2018 | Rackley, III | G06Q 20/023 |
| 10,325,311 B2 | 6/2019 | Zimmer et al. | |
| 11,188,907 B1* | 11/2021 | Vijayvergia | G06Q 20/401 |
| 2002/0032651 A1* | 3/2002 | Embrey | H04M 15/68 |
| | | | 705/40 |
| 2003/0158811 A1* | 8/2003 | Sanders | G06Q 20/00 |
| | | | 705/34 |
| 2004/0073503 A1 | 4/2004 | Morales et al. | |
| 2005/0160019 A1 | 7/2005 | Cluse et al. | |
| 2006/0289621 A1 | 12/2006 | Foss et al. | |
| 2007/0055594 A1 | 3/2007 | Vest et al. | |
| 2008/0301046 A1 | 12/2008 | Martinez et al. | |
| 2009/0132273 A1 | 5/2009 | Boesch | |
| 2011/0106703 A1 | 5/2011 | Jay et al. | |
| 2013/0073457 A1 | 3/2013 | Sander et al. | |
| 2013/0238491 A1 | 9/2013 | Bouey et al. | |
| 2013/0238492 A1 | 9/2013 | Muthu et al. | |
| 2014/0114853 A1 | 4/2014 | Guedj | |
| 2015/0127527 A1 | 5/2015 | Eide | |
| 2016/0253639 A1 | 9/2016 | Sharma | |
| 2017/0316393 A1 | 11/2017 | Berman et al. | |
| 2019/0116034 A1* | 4/2019 | Sengupta | G06Q 10/103 |

FOREIGN PATENT DOCUMENTS

| | | |
|---|---|---|
| EP | 1220175 A2 | 7/2002 |
| EP | 1410343 A1 | 4/2004 |
| EP | 1488343 A2 | 12/2004 |
| EP | 3101603 A1 | 12/2016 |
| GB | 2515529 A | 12/2014 |
| WO | 2008142377 A1 | 11/2008 |
| WO | 2009004393 A1 | 1/2009 |

OTHER PUBLICATIONS

Notification Concerning Transmittal of Copy of International Preliminary Report on Patentability from related PCT Application No. PCT/US2021/037543, dated Dec. 29, 2022.

* cited by examiner

SYSTEM AND METHOD FOR FACILITATING TRANSFER OF ELECTRONIC PAYMENT INFORMATION

FIELD OF THE INVENTION

This disclosure relates generally to systems and methods for automated processing of account payment transactions, and more particularly, to an automated system and method for transferring electronic payee account information from one financial institution account to another.

BACKGROUND OF THE INVENTION

Financial account holders carry out account transactions involving many individual merchant and other payee accounts. In many cases, payments and other transactions between payees and financial institution account holders are facilitated through the use of account information held in a database by the financial institution. This simplifies on-line transactions for account holders by making it so they need not enter payment account information (e.g., payee identification and account number) every time they conduct a transaction. The downside to this convenience is that when an account holder wishes to transfer his or her financial account from one bank to another, there may be a large number of merchant or other consumer accounts for which the account holder would need to re-enter payment information in association with the new account. While this may not be the fault of the original bank, the hassle of transferring may produce a negative association with that bank, which may build on the account holder's reasons for wanting to transfer the account in the first place.

SUMMARY OF THE INVENTION

An illustrative aspect of the invention provides an automated method of transferring payment account information. The method comprises receiving, by an account information processing system of a first account provider, a payment information transfer request from an account holder device associated with an account holder and a first provider account. The method further comprises transmitting, by the account information processing system to the account holder device for display to the account holder, a list of one or more payees to which electronic payments have been made from the first provider account. The method further comprises receiving, by the account information processing system from the account holder device, a user selection of at least one selected payee from the list of one or more payees. The method still further comprises assembling by the account information processing system a payment account information data file including payment account information for each selected payee in a predetermined data format. The payment account information data file is then transmitted to at least one of the set consisting of the account holder device and an information processing system of a second account provider.

Another aspect of the invention provides an automated account information processing server comprising a communication interface in communication with one or more networks, a user authentication processor, a payment information selection processor, a payment information assembly processor, and a payment information transmission processor. The user authentication processor is configured to receive, from an account holder device via the communication interface and a first network, a payment information transfer request. The account holder device is associated with an account and an account holder. The user authentication processor is further configured to verify the authenticity of the payment information transfer request. The payment information selection processor is configured to obtain electronic payment transaction information for electronic payments made from the account, assemble, using the electronic payment transaction information, a list of payees to which electronic payments have been made from the account, transmit, to the account holder device via the communication interface and the first network, the list of payees to the account holder device, and receive, from the account holder device via the communication interface and the first network, a user selection of at least one selected payee from the list of payees. The payment information assembly processor is configured to assemble, using a predetermined data format, a payment account information data file including payment account information for each selected payee. The payment information transmission processor is configured to transmit, via the communication interface and a second network, the payment account information data file to at least one of the set consisting of the account holder device and an information processing system of a second account provider.

Another aspect of the invention provides a user interface device for facilitating a transfer of payment account information from a first account with a first account provider to a second account with a second account provider. The user interface device comprises a user device data processor, a user interface including a user input arrangement and a display, a communication interface selectively connectable to a network for communication there-over, and a user device memory accessible by the user device data processor. The user device memory has stored thereon a banking transfer application comprising instructions to the user device data processor to transmit, to a first remote server via the communication interface and the network, a request to transfer payment information associated with a first account. The banking transfer application further comprises instructions to conduct interactive communication with the first remote server during which user responses are requested and received from the user via the user interface and transmitted to the first remote server. The user responses include a selection of one or more payees from a list of payees that have received electronic payments from the first account. The application further comprises instructions to receive from the remote server via the communication interface and the network, a payment account information data file including payment account information for each selected payee and to transmit, to a second remote server via the communication interface and the network, a request to add payment account information to a second account. The request to add includes the payment account information data file.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
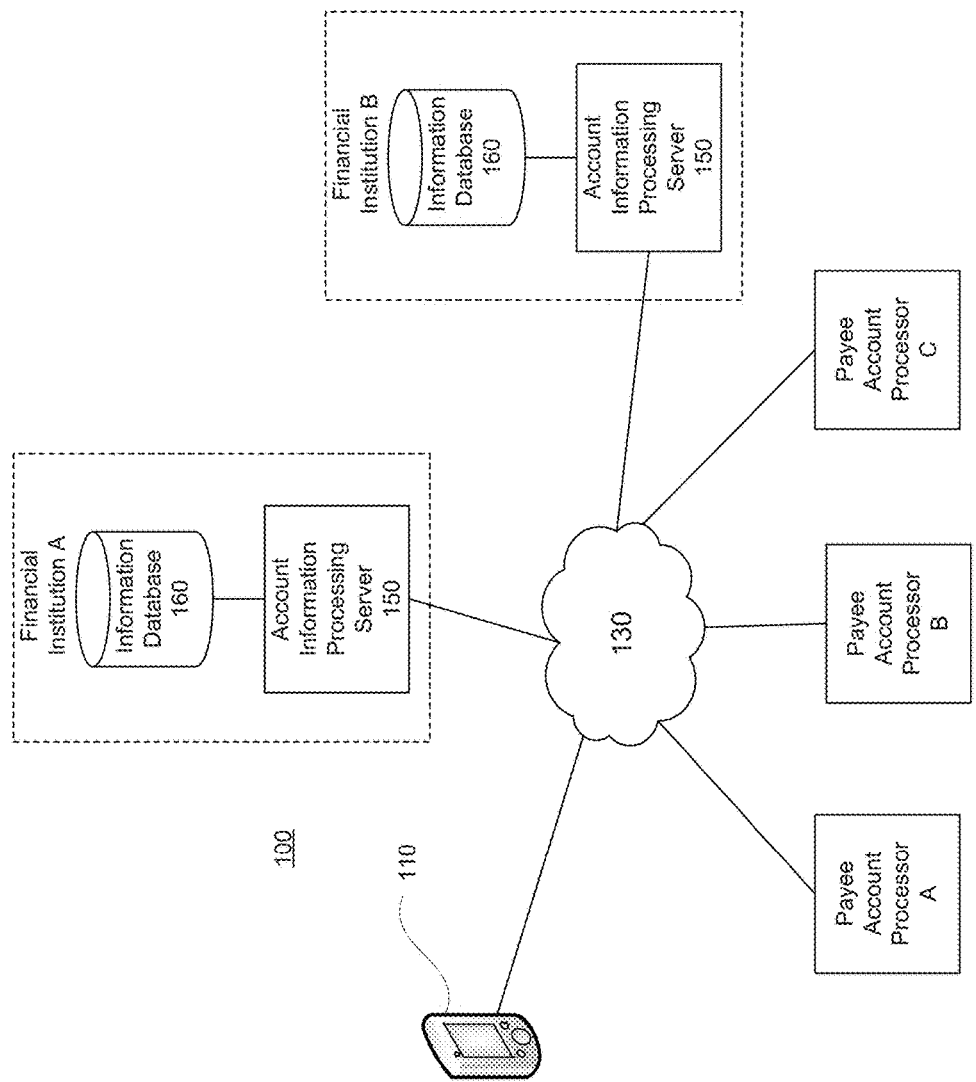
FIG. 1 is a representation of a system for transferring payment information from a first financial institution to a second financial institution according to an embodiment of the invention.

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides automated methods by which a bank account holder wishing to transfer a financial account from one financial institution to another may easily transfer payee account information as well.

As used herein, the term financial account encompasses any account from which electronic payments. Financial accounts can include, for example, credit accounts, savings accounts, checking accounts, investment accounts, and the like. As used herein, electronic payments refers to any form of payment or transfer of funds from a financial account to a payee account that is accomplished via the transfer of information over a network. In many instances, electronic payments to a single payee are made on a regular, recurring basis. Some such payments may have a fixed amount (e.g., a monthly rent payment), while others may have a varying amount (e.g., a revolving credit card payment). Some electronic payments (e.g., wire transfers) may be made to a payee on a sporadic or even a one-time-only basis. In any of these cases, the bank or other financial institution may accomplish the electronic payment on behalf of the account holder. The account holder, however, may be required to provide all information on the payee necessary for the financial institution to effect the payment (referred to herein as "payment account information"). Payment account information may include payee identification information. This is typically accomplished by providing the account holder with a financial account application or website portal through which the account holder can enter the payment account information. An account information processing server at the financial institution may receive the payment account information and store it in a database so that the account holder need not re-enter the information for future payment transactions.

The systems and methods of the present invention facilitate the transfer of payment account information from one financial institution to another. As used herein, the term "financial institution" refers to any entity that may provide electronic payment functionality, such as banks, credit issuers, investment companies, online bill payment providers, etc. In embodiments of the invention, an account holder having an account with a first financial institution may request a transfer of payment account information used to make payments from that account. This may be in conjunction with a closure of the account, but it need not be. The account holder may request that payment account information be provided for any or all payees to which electronic payments have been made from the account. The first financial institution may assist the account holder in identifying specific payees and may then assemble a data file of the payment account information for these payees. The data file may constructed using a standardized data format so that other financial institutions can read the file to obtain the account holders payee information. The first financial institution may incorporate information on the account holder into the data file and/or apply security measures to discourage or inhibit or facilitate detection of tampering with the data file. The first financial institution may then transfer the data file or otherwise make the data file available to a second financial institution, either directly or through the account holder. If security measures are incorporated into or applied to the data file, the second financial institution may use them to validate and/or verify the integrity of the information in the data file. In some embodiments, the second financial institution may also use the account holder information to verify the legitimacy of the transfer and bolster the security of a new account opened by the account holder.

Embodiments of the invention may be best understood with reference to FIG. 1, which illustrates an exemplary financial system 100 that encompasses one or more user devices 110 and a plurality of financial institutions, each having an account information processing server 150 and a payment information database 160. In the illustrated example, a user device 110 and the processing servers 150 of Financial Institution A and Financial Institution B are network-enable computer systems configured to communicate with each other and a plurality of payee processors (Payee Account Processors A, B and C) via a communication network 130.

As referred to herein, a network-enabled computer system and/or device may include, but is not limited to any computer device, or communications device including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

The network-enabled computer systems used to carry out the transactions contemplated in the embodiments may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information. It will be understood that the depiction in FIG. 1 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

The network 130 may be any form of communication network capable of enabling communication between the transaction entities and the card processing system 100. For example, the network 130 may be one or more of a wireless network, a wired network or any combination of wireless network and wired network. The network 130 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 130 may utilize one or more protocols of one or more network elements to which it is communicatively coupled. The network 130 may translate to or from other protocols to one or more protocols of network devices. Although the network 130 is depicted as a single network, it will be appreciated that it may comprise a plurality of interconnected networks, such as, for example, the Internet, a service provider's network, a cable television network, corporate networks, and home networks.

In the example embodiments presented herein, an account holder may be any individual or entity having a transaction account with a financial institution. An account holder user device 110 may be a mobile device or other processor that an account holder uses to carry out a transaction. An account may be held by any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, or mobile commerce account. In some instances, the account holder may be a transaction processing entity such as a financial institution, credit card provider, or other entity that offers accounts to customers.

Figure 2:
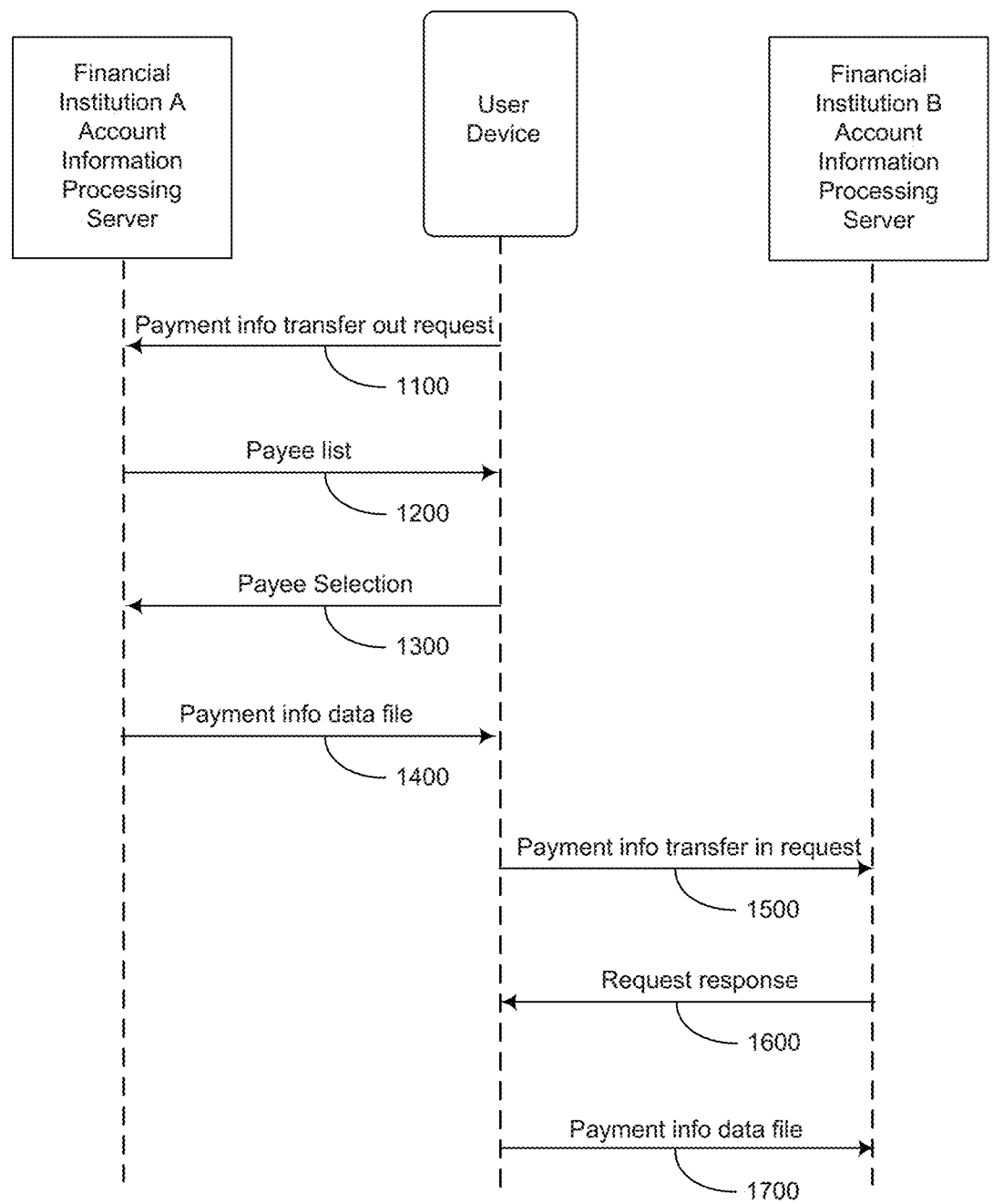
FIG. 2 illustrates a sequence of operations for transferring payment information from a first financial institution to a second financial institution according to an embodiment of the invention.

The sequence diagram of FIG. 2 illustrates an exemplary application of embodiments of the invention in conjunction with the system 100 of FIG. 1. In the scenario set forth in FIG. 2, an account holder using a user computing device transmits a payment information transfer request to Financial Institution A at 1100. The transfer request indicates that the account holder would like to transfer the payment account information for some or all payees to which electronic payments have been made from the account holder's Financial Institution A account. An account information processing server at Financial Institution A receives the request and assembles a payee list, which it may transmit to the account holder's user device at 1200. The account holder may then select some or all of the payees for which the account holder wants to transfer information. The account holder's selections are transmitted back to the Financial Institution A server at 1300. The account information processing server then retrieves the requested payment account information and creates a payment account information data file in a standardized data format, which it then transmits to the account holder user device at 1400. The account holder may immediately or at some later time transmit using the user device at 1500 a request to transfer payment account information into an account at Financial Institution B, which the account holder has previously opened or is in the process of opening. The Financial Institution B server may send a response to the user device providing instructions and/or requesting information at 1600. At 1700, the account holder transmits the payment information data file to the Financial Institution B account information processing server. Because of the standardized data format, the Financial Institution B server is able to read the data file and create and store its own payment records for association with the account holder Financial Institution B account.

Figure 3:
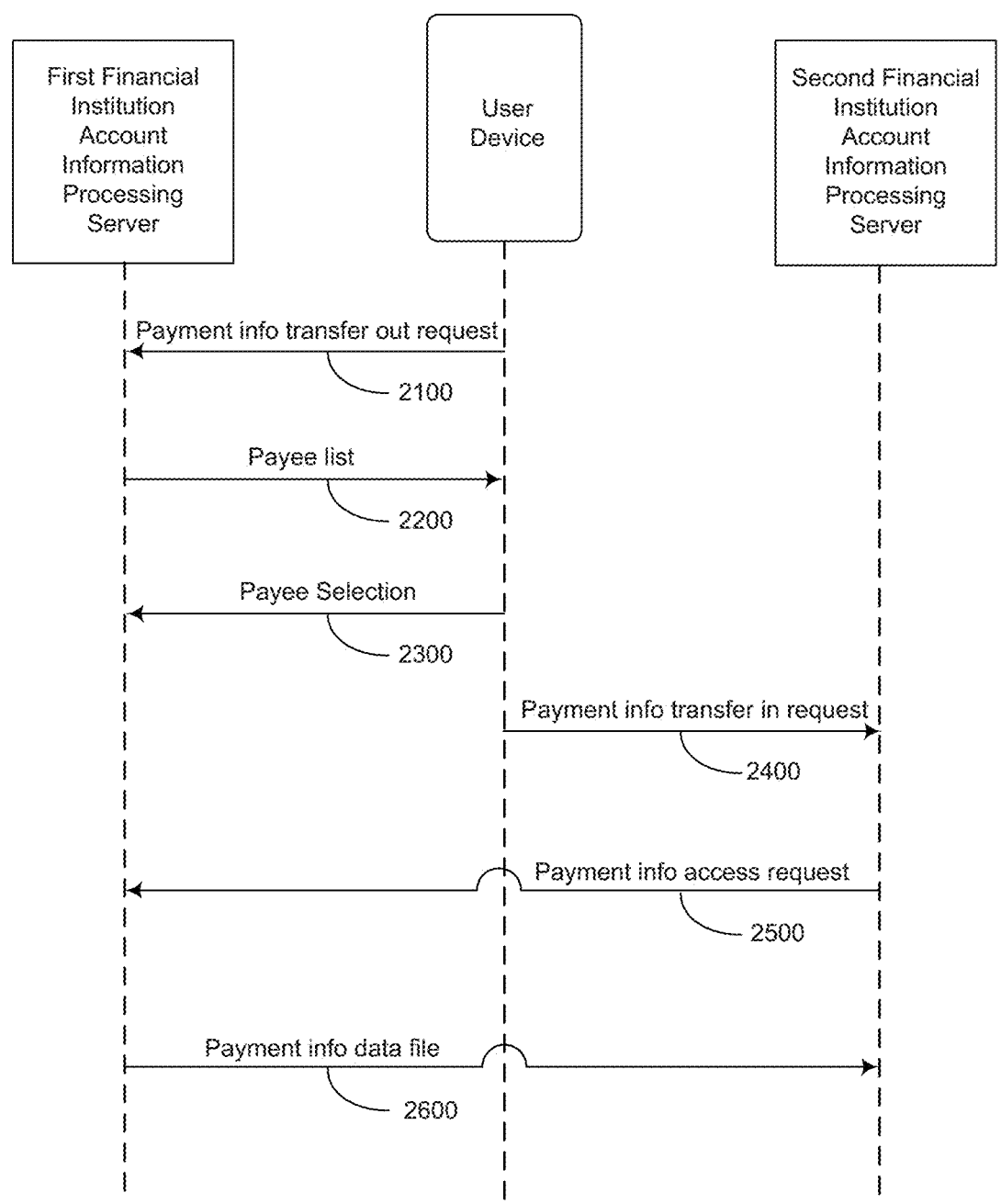
FIG. 3 illustrates a sequence of operations for transferring payment information from a first financial institution to a second financial institution according to an embodiment of the invention.

In the above scenario, the payment account information data file is provided to the account holder who can then, in turn, provide it to any second account service provider he wishes. In other scenarios, the data file may be provided directly to another account service provider. The sequence diagram of FIG. 3 illustrates a scenario of this type. As in the previous scenario, an account holder using a user computing device transmits a payment information transfer request to Financial Institution A at 2100. The transfer request indicates that the account holder would like to transfer the payment account information for some or all payees to which electronic payments have been made from the account holder's Financial Institution A account. In this scenario, the request may specify that the transfer will be to Financial Institution B. An account information processing server at Financial Institution A receives the request and assembles a payee list, which it may transmit to the account holder's user device at 2200. The account holder may then select some or all of the payees for which the account holder wants to transfer information. The account holder's selections are transmitted back to the Financial Institution A server at 2300. The account holder may transmit using the user device at 2400 a request to transfer payment account information into an account at Financial Institution B, which the account holder has previously opened or is in the process of opening. The Financial Institution B server may then send a payment information access request to the Financial Institution Server at 2500. The account information processing server at Financial Institution A may then retrieve the requested payment account information and create a payment account information data file in a standardized data format, which it then transmits to the Financial Institution B account information processing server at 2600. Because of the standardized data format, the Financial Institution B server is able to read the data file and create and store its own payment records for association with the account holder Financial Institution B account. It will be understood that one or both of the actions 2500, 2600 may be accomplished through the use of an application program interface (API).

Details of system components usable in embodiments of the invention and, in particular, the system 100 will now be described.

Figure 4:
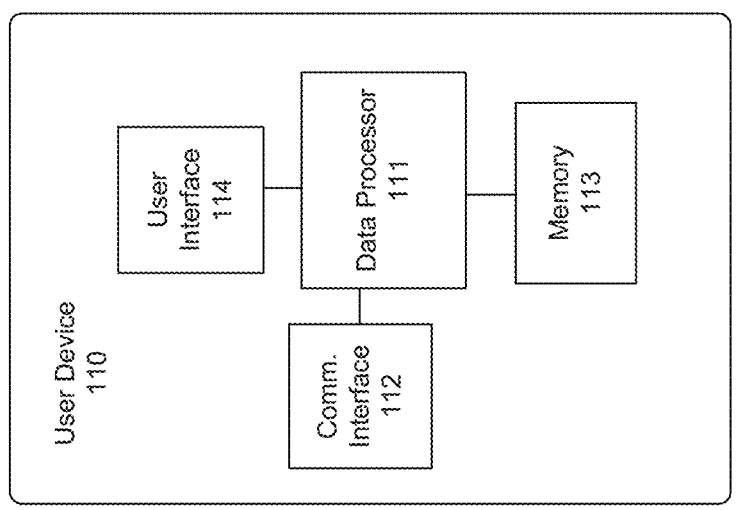
FIG. 4 is a schematic representation of a user processing device usable in embodiments of the invention.

With reference to FIG. 4, the account holder user device 110 may be any computer device or communications device including a server, a network appliance, a personal computer (PC), a workstation, and a mobile interface device such as a smart phone, smart pad, handheld PC, or personal digital assistant (PDA). In a particular embodiment illustrated in FIG. 3, the user device 110 includes an on-board data processor 111 in communication with a memory module 113, a user interface 114, and a communication interface 112. The data processor 111 may include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 114 of the device 110 includes a user input mechanism, which can be any device for entering information and instructions into the user device 110, such as a touch-screen, keyboard, mouse, cursor-control device, microphone, stylus, or digital camera. The user interface 114 may also include a display, which can be any type of device for presenting visual information such as a computer monitor, a flat panel display, and a mobile device screen, including liquid crystal displays, light-emitting diode displays, plasma panels, and cathode ray tube displays.

The communication interface 112 is configured to establish and support wired and/or wireless data communication capability for connecting the device 110 to the network 130 or other communication network. The communication interface 112 can also be configured to support communication with a short-range wireless communication interface, such as near field communication, radio-frequency identification, and Bluetooth.

In embodiments of the invention, the memory 113 may have stored therein one or more applications usable by the data processor 111 to conduct and/or monitor transactions between the user device 110 and merchant transaction processing devices or other transaction processing systems over the network 130. These applications may include instructions usable by the data processor 111 to identify transaction events, store event data in the memory 113, and communicate event data to a transaction information processing system and/or one of the account information processing servers 150.

In particular embodiments, the memory 113 may include an account change application having instructions for facilitating changes from a first bank account associated with a first financial institution (Financial Institution A) to a second bank account associated with a second financial institution (Financial Institution B). In embodiments of the present invention, the account change application is associated with the first bank account and may be a part of a suite of applications for carrying out transactions involving the first bank account. The account change application may, in particular, include instructions for facilitating a transfer of payment account information. The application instructions may be configured for receiving, from the account holder via the user interface 114, login information for establishing authenticatable communication with the account information processing server 150 of Financial Institution A. The login information may include an account identifier or other user identification and user authentication information. The user authentication information may include, a password or a scanned biometric characteristic. In some embodiments, the user authentication information may be or include information encrypted using an encryption key associated with the first bank account and the account holder or the user device 110. Alternatively or in addition, the user authentication information may include card verification information obtained from a smart card associated with the first bank account.

The payment information transfer instructions may be configured to transmit a login request to the account information processing server 150 of Financial Institution A via the network 130. This request would include the user identification and user authentication information. The instructions may be further configured to establish an interactive communication session between the user device 110 and the account information processing server 150. The application may be configured to receive instructions from the account holder via the user interface 114 and to construct and transmit to the account information processing server 150, a request to transfer payment information for payees of electronic payments made from the first account. The change request may include identification information for the first bank account and/or identification of certain specific payees. In some embodiments, the request may also identify a second financial institution (Financial Institution B) to which the payment information is to be transferred.

The account change application instructions and, in particular, the payment information transfer instructions may be configured to, as part of a previously established interactive communication session or in a newly established interactive communication session, receive information and instructions, from the account information processing server 150 via the communication interface 112 and the network 30. The instructions may, in particular, be configured for receiving and presenting to the user via the user interface 114 a list of payees from which the account holder may select the payees for which payment information is to be transferred. The application may then cause the user device 110 to transmit the account holder's selection(s) to the Financial Institution A account information processing server 150. In some embodiments, the application may be configured to receive and respond to additional requests for information from the Financial Institution A account information processing server 150. This may include, for example, a request to identify Financial Institution B to which the payment information is to be transferred if such information is required and has not otherwise been provided. It may also include information necessary to identify the account holder's account with Financial Institution B.

In some embodiments, the payment transfer instructions may include instructions to receive a payment account information data file from the Financial Institution A account information processing server 150 and store the data file in the memory 113. The data processor 111 may subsequently be instructed (e.g., by an account management application associated with the second account at Financial Institution B) to retrieve the payment account information data file and transmit it to the Financial Institution B account information processing server 150.

It will be understood that in typical embodiments, the payment account information data file may be configured so as to prevent access and/or alteration of the information stored therein by the account holder using the user device 110 or other data processing system. This provides security and added confidence for any subsequent service provider to which the data file is provided for use.

In some cases, an account holder may wish to re-establish their electronic payment functionality using their account with Financial Institution A. Accordingly, in some embodiments, the payment transfer instructions may be configured to cause the data processor 111 to selectively transmit to the Financial Institution A account information processing server 150 via the network 130, a request to reinstate the payment information from the payment account information data file. In some such embodiments, the data file may be included with the request. In others, the instructions may be configured to receive a response from the account information processing server 150 and to transmit the data file in response.

The account information processing servers 150 are each a system of one or more network-enabled data processing systems associated with a financial institution and configured for management and control of information relating to a plurality of bank accounts. As described in the above exemplary transfer scenarios, the account holder's first bank account is one of a plurality of accounts associated with the Financial Institution A account information processing server 150, and the account holder's second bank account is one of a plurality of bank accounts associated with the Financial Institution B account information processing server 150. Each account information processing server 150 may be in communication with a payment information database 150 having stored therein information on electronic payment transactions involving their respective accounts. Such information may include, in particular, any or all payee information needed to process future electronic payment transactions with each transaction payee. Each account information processing server 150 may be configured for communication with a plurality of user devices 110 via the network 130 for establishing interactive communication sessions with account holders. The account information processing servers 150 may also be configured for communication with other entities via the network including, for example, Payee Account Processors A, B, C. As discussed in more detail below, the account information processing servers 150 may be further configured for verifying account holder identification information (e.g., login information) and/or user device authorization for obtaining account information. Upon verification of authorization, the account information processing servers 150 may receive and evaluate requests to transfer payment information, retrieve requested information from the account information databases 152, and assemble and transmit payment account information data files.

Figure 5:
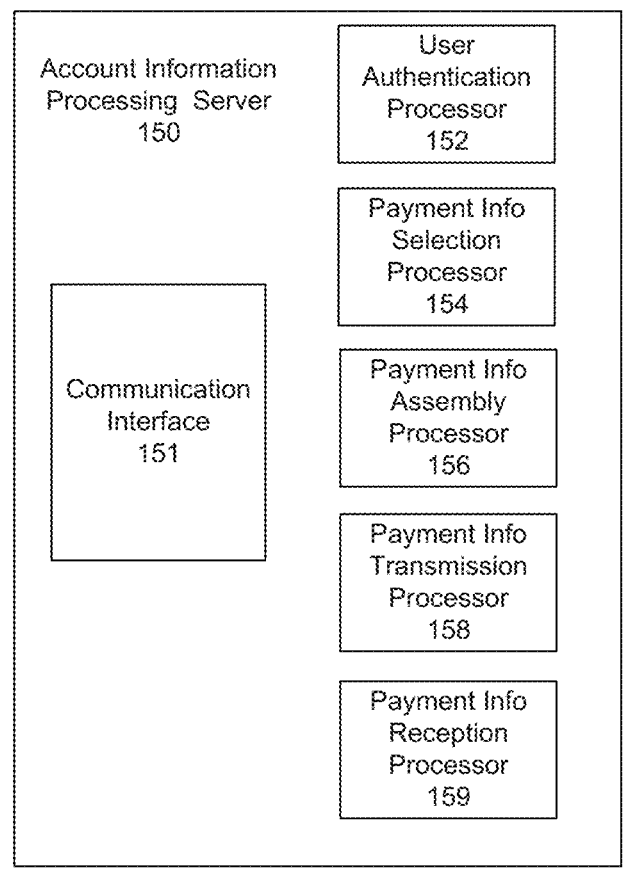
FIG. 5 is a schematic representation of account information processing server according to an embodiment of the invention.

With reference to FIG. 5, the account information processing server 150 may include a communication interface 151 configured for establishing communication with one or more networks including the network 130, and, via the one or more networks, the user device 110 and one or more other account information processing servers 150. In some embodiments, the communication interface 151 may be further configured for communication with a plurality of payee account processors (e.g., Payee Account Processors A, B, C).

The account information processing server 150 may comprise a user authentication processor 152, a payment information selection processor 154, a payment information assembly processor 156, and a payment information transmission processor 158. The user authentication processor 152 may be configured to receive, from an account holder device 110 via the communication interface 151 and the network 130, a payment information transfer request. This request may be received as part of an interactive communication session between the user device 110 and the processing server 150. Alternatively, user authentication processor 152 may be configured to, in response to receiving the transfer request, establish interactive communication with the user device 110. The user authentication processor 152 may be configured to receive a login request from the user interface device 110 via the communication interface 151 and the network 130 and to authenticate the login request using user identification and user authentication information included therein. The user authentication processor 152 may be configured, in particular, to use the user identification and user authentication information to verify that the user and/or user device are associated with the account holder's first bank account and are authorized to make a change request. In some embodiments, the authentication information may be or include a user name and password combination submitted as part of the login procedure. In some embodiments, the authentication information may be provided in response to a prompt transmitted to the user device 110 by the user authentication processor 152.

The user authentication processor 152 may be configured to receive multi-factor authentication information from the user device 110. Such information may include account holder biometric characteristic information or information encrypted using previously assigned device- or user-specific encryption keys. In some such embodiments, the authentication information may be or include information encrypted using an encryption key specific to the first account. The user authentication processor 152 may be further configured for decrypting (if applicable) the authentication information and comparing it to previously obtained authentication information associated with the first bank account to authenticate the login request.

The payment information transfer request may include identification of a specific account with the financial institution and may specify that payment information for one or more payees to whom electronic payments have been made from the account is to be transferred to another financial institution. In some embodiments, the request may identify some or all of the payees. The payment information selection processor 154 may be configured to receive the request from the user authentication processor 152 or from the user device 110 via the communication interface 151. In embodiments where the payees are not specified in the request, the selection processor 154 may be configured to use electronic payment transaction information to assemble a list of payees to whom electronic payments have been made from the account. These payment transactions may include, without limitation, payments made via ACH transfer and wire transfers.

In some embodiments, the payees and the payment information needed to make future payments to such payees may be stored directly in a payment information database 160. In other embodiments, the selection processor 154 may be configured to identify transactions in which an electronic payment was made from the account and, for each such transaction, determine from electronic payment transaction records stored in the payment information database 160 the payment account information used to effect the electronic payment. Such payment account information would include identification of the transaction payee, the type of transaction, and all information required to make future similar payments to such payee. The selection processor 154 may be further configured to assemble the list of payees and transmit it to the user device 110 for display to the account holder. The selection processor 154 may also be configured to receive, from the account holder device 110 via the communication interface 151 and the network 130, a user selection of one or more payees from the payee list for which the account holder wishes to transfer information. In many cases—particularly those cases where the entire account is being closed—the account holder selection will simply be an indication that information for all electronic payees should be included in the transfer.

The payment information assembly processor 156 is configured to, upon receiving the account holders payee selections, assemble a payment account information data file including payment account information for each selected payee. If not already extracted by the payment information selection processor 154, the payment information assembly processor 156 may determine payment information for each payee using payment transaction information from the database 160. To effect a significant improvement in the efficiency and security of the transfer, the payment information assembly processor 156 may be configured to assemble the data file using a standardized format agreed to by one or more financial institutions (e.g., Financial Institutions A and B). Such a format would use predetermined fields for information such as payee entity type and identification, transaction type, regular payment amount and frequency (if applicable). All information necessary to effect a future payment to the payee in the manner previously used in an electronic transaction may be included in the payment account information data file.

The payment information assembly processor 156 may be further configured to include account holder information in the payment account information data file. Such information may be used by the transferee institution to authenticate a prospective user of the data file and/or to match information to verify that the data file is being properly associated with the right account and account holder. Typical account holder information could include name, email address, physical address, phone number, employer, social security number or other unique identifier, etc.

The payment information assembly processor 156 may be further configured to apply security measures to the payment account information data file. Such security measures may be aimed at inhibiting or preventing unauthorized access to the payment information or account holder information stored in the data file and/or to prevent tampering with this information. In particular embodiments, the payment information assembly processor 156 may be configured to encrypt some or all of the information stored in the data file using one or more keys available only to the financial institutions that have agreed to the data file format. Among other things, this would prevent access to the data file information by the account holder in embodiments where the data file is provided to the account holder. In some embodiments, the security measures could merely include measures for determining whether changes have been made to the data file. This could include, for example, including a check-sum or similar method that would allow the receiving financial institution an indicator that some or all of the data has been altered after creation of the data file by the transferring institution.

The payment information transmission processor 158 is configured to transmit the payment account information data file via the communication interface 151 and the network 130 or another network. In some embodiments, the data file is transmitted to the account holder device 110 for future transmission to a transferee financial institution. In other embodiments, the data file is transmitted directly to an information processing system 150 of the transferee financial institution. In some embodiments, the transmission processor 158 may be configured to post the data file to a secure network address where it can be downloaded by an authorized entity (e.g., the account holder or transferee institution). In such embodiments, the payment information transmission processor 158 may be configured to transmit a notification to the account holder and/or transferee financial institution indicating the location of the data file and providing access instructions. The transmission processor 158 and/or the user authentication processor 152 may be further configured to authenticate any attempt to access the data file at the secure network address according to previously described authentication methods.

In some embodiments, the account information processing server 150 may also comprise a payment information reception processor 159 configured for receiving electronic payment information prepared by a processing server 150 at another financial institution. In such embodiments, the user authentication processor 152 may be configured to authenticate the transfer-in request and/or the requesting user device 110 as described above. This may be accomplished as part of an already established interactive communication session. Alternatively an interactive session may be initiated in response to receiving the request. Upon successful authentication, the request may be received by the payment information reception processor 159. In some embodiments, the transfer-in request may include a payment account information data file. In other embodiments, such a data file may be transmitted to the reception processor 159 by the user device 110 in response to a request sent to the user device 110 by the payment information reception processor 159. In still other embodiments, the transfer-in request may identify the financial institution from which the payment information is being transferred and provide access information sufficient for the new financial institution to contact and request a transfer of the payment account information data file. In such embodiments, the payment information reception processor 159 may be configured to establish communication with the account information processing server 150 of the transferor institution and transmit a request for the data file.

The payment information reception processor 159 may be configured to receive the payment account information data file as described above and, by virtue of the previously described standard data format, read the payee account information stored therein and associate it with an account associated with the requesting user device. The payment account information may then be stored in the payment information database 160 for use in making future electronic payments from the associated account.

The reception processor 159 may be configured to verify that the data file has not been altered using the security techniques described above. In embodiments, where some or all of the payment account information data file is encrypted, the reception processor 159 may be configured to decrypt the data file using the encryption keys.

The payment information reception processor 159 may also be configured to read the account holder information and compare it to information previously associated with the account of the transfer-in requestor. This allows the verification that the correct payment information is being associated with the new account.

Figure 6:
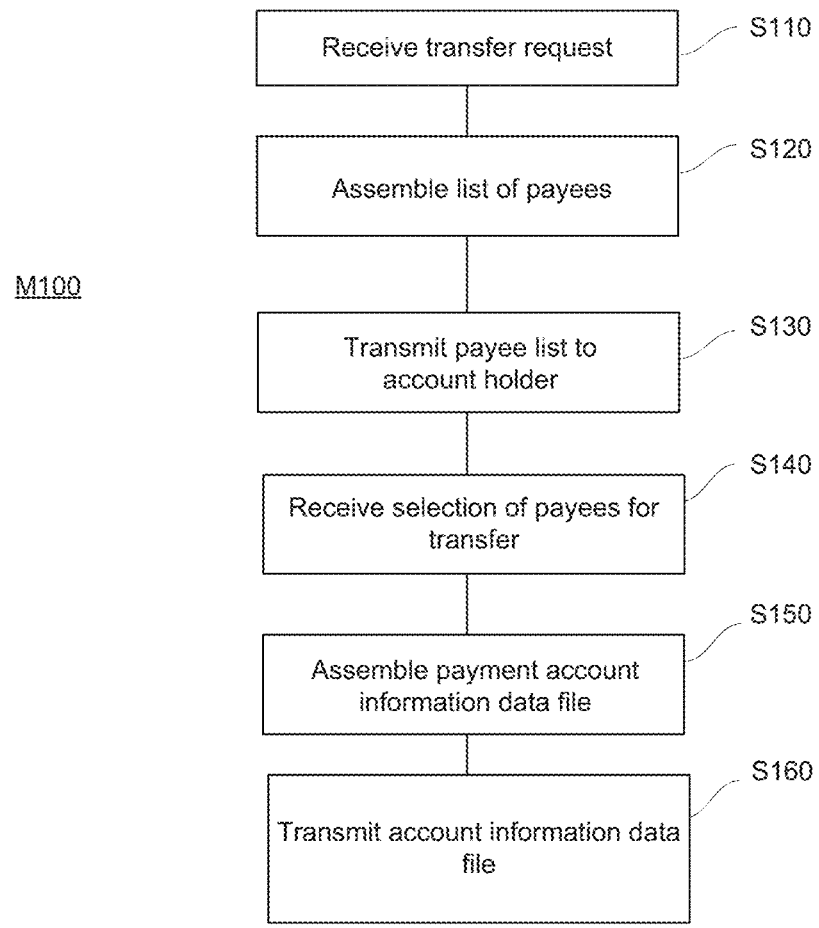
FIG. 6 is a flow diagram illustrating a method of transferring payment account information according to an embodiment of the invention.

FIG. 6 illustrates an exemplary method M100 of transferring payment account information according to an embodiment of the invention. In this method M100, the user is an account holder who wishes to transfer payment account information for one or payees from a first bank account (typically associated with a first financial account provider (e.g., a bank or other financial institution)) to a second bank account (typically associated with a second financial account provider). The actions of the method may be carried out by an account information processing server or system associated with the administrator or holder of the first bank account.

At S110 of the method M100, a payment information transfer request is received by the account information processing server from a user device associated with an account holder and a first provider account. In some embodiments, this request may be received as part of an interactive session between the user device and the account information processing server. In establishing this session or, in some cases, after receiving a standalone request, the account information processing server may request and, receive from the user device, user and/or user device, authentication information that the server may use to verify that the user and/or user device are associated with the second bank account and are authorized to make the change request. In some embodiments, the authentication information may be or include a user name and password combination submitted as part of a login procedure. In some embodiments, the authentication information may be provided in response to a prompt transmitted to the user device by the account information processing server. In some embodiments, multi-factor authentication information may be required. This may require, in some cases, that the user device provide authentication information that includes information encrypted using previously assigned device- or user-specific encryption keys. In some such embodiments, the authentication information may be or include information encrypted using an encryption key specific to a transaction card associated with the second account.

The request to transfer payment information may include identification information for the first bank account. This may include identification of the banking institution, the type of account, and/or a unique account identifier. The request may also include identification of specific payees for which the account holder wishes to have payment information transferred. In some embodiments, the request may also identify a second account provider and/or a second financial account to which the payment information is to be transferred.

At S120, the account information processing server assembles a list of one or more payees to which electronic payments have been made from the first provider account. The list may include payees identified by the account holder and/or payees identified using information obtained from a payment information database. The information obtained may be or include information derived from electronic payment transaction records stored in the database. Such payment transactions may include, for example, payments made via ACH transfer or wire transfers. Information derived from the transaction records may include identification of the transaction payee, the type of transaction, and information required to make future similar payments to such payee. In some cases, payee information may be determined only for transactions occurring after a particular date or within a specified time interval prior to the request. In other cases, the payee list may be limited to payees involved in a minimum number of transactions or to payees for whom recurring periodic payments are scheduled.

At S130, the account information processing server transmits the assembled payee list to the account holder user device for display to the user and at S140, receives from the user device a selection of one or more payees made by the account holder from the payee list. At S150, the account information processing server assembles a payment account information data file including payment account information for each selected payee. This may include retrieving payment transaction records from the payment information database and extracting information used to effect payment to each payee. The payment information for each payee is then written into the payment account information data file in a predetermined standardized data format. This format may include predetermined fields for information such as payee entity type and identification, transaction type, regular payment amount and frequency (if applicable). All information necessary to effect a future payment to the payee in the manner previously used in an electronic transaction may be included in the payment account information data file.

Assembly of the payment account information data file may also include incorporating account holder information that may be used by a transferee account provider to authenticate a prospective user of the data file and/or to match information to verify that the data file is being properly associated with the right account and account holder. Typical account holder information could include name, email address, physical address, phone number, employer, some or all of a social security number or other unique identifier, etc.

Assembly of the data file may also include application of security measures to inhibit or prevent unauthorized access to the payment information. Such measures may include encryption of some or all of the payment and/or account holder information data as previously described.

At S160, the account information processing server transmits the account information data file to a recipient, which is typically either the account holder user device or a processing system of a second financial account provider (i.e., transferee). In some embodiments, the account information data file may be transmitted or otherwise made accessible via a network-accessible location having an associated network address. In such embodiments, the method M100 may include transmitting a notification of the network address to one or both of the account holder user device and the transferee processing system. This notification may also note that the data file will only be available for access at the network address for a limited time period. In some cases, the actions associated with transmitting the account information data file may be carried out in response to an access request received from the user device or the transferee processing system.

Figure 7:
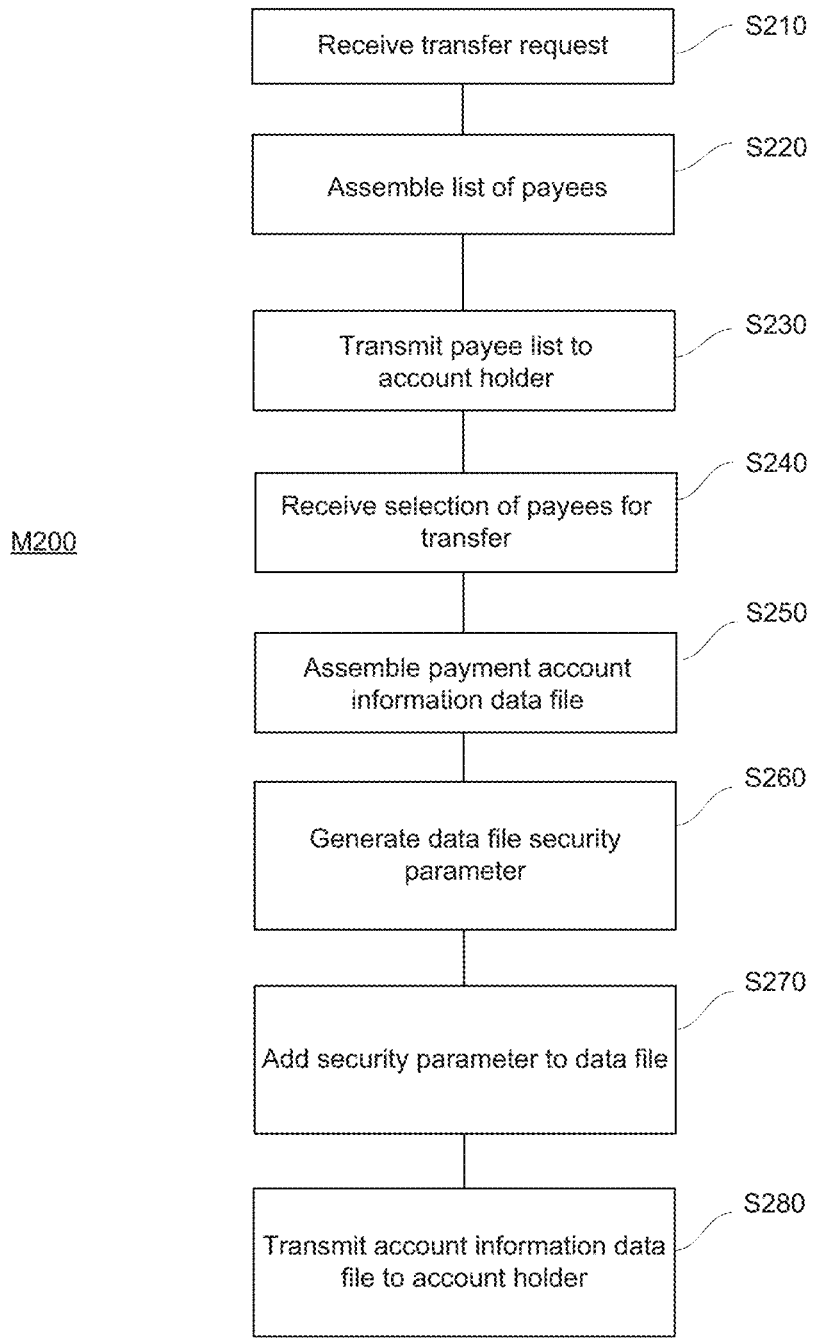
FIG. 7 is a flow diagram illustrating a method of transferring payment account information according to an embodiment of the invention.

FIG. 7 illustrates another exemplary method M200 of transferring payment account information according to an embodiment of the invention. As in the previous method, the user is an account holder who wishes to transfer payment account information for one or payees from a first financial account provider to a second financial account provider.

At S210 of the method M100, a payment information transfer request is received by the account information processing server from a user device associated with an account holder and a first provider account. In some embodiments, this request may be received as part of an interactive session between the user device and the account information processing server. In establishing this session or, in some cases, after receiving a standalone request, the account information processing server may authenticate the request as previously described. The request to transfer payment information may include identification information for the first bank account. This may include identification of the banking institution, the type of account, and/or a unique account identifier. The request may also include identification of specific payees for which the account holder wishes to have payment information transferred. In some embodiments, the request may also identify a second account provider and/or a second financial account to which the payment information is to be transferred.

At S220, the account information processing server assembles a list of one or more payees to which electronic payments have been made from the first provider account. The list may include payees identified by the account holder and/or payees identified using information obtained from a payment information database. The information obtained may be or include information derived from electronic payment transaction records stored in the database. Such payment transactions may include, for example, payments made via ACH transfer or wire transfers. Information derived from the transaction records may include identification of the transaction payee, the type of transaction, and information required to make future similar payments to such payee.

At S230, the account information processing server transmits the assembled payee list to the account holder user device for display to the user and at S240, receives from the user device a selection of one or more payees made by the account holder from the payee list. At S250, the account information processing server assembles a payment account information data file including payment account information for each selected payee. This may include retrieving payment transaction records from the payment information database and extracting information used to effect payment to each payee. The payment information for each payee is then written into the payment account information data file in a predetermined standardized data format as previously described. All information necessary to effect a future payment to the payee in the manner previously used in an electronic transaction may be included in the payment account information data file. Assembly of the payment account information data file may also include incorporation of account holder information as described above.

At S260, the account information processing server generates a data file security parameter for the payment account information data file. This security parameter is then added to the payment account information data file at S270. The data file security parameter is constructed based on the payment and/or account holder information stored in the data file. The security parameter may be constructed using an algorithm that can be used to recalculate the security parameter by the transferee institution and compared to the stored parameter to verify that the information stored in the data file has not been altered.

At S280, the account information processing server transmits the account information data file to a recipient, which is typically either the account holder user device or a processing system of a second financial account provider (i.e., transferee).

Figure 8:
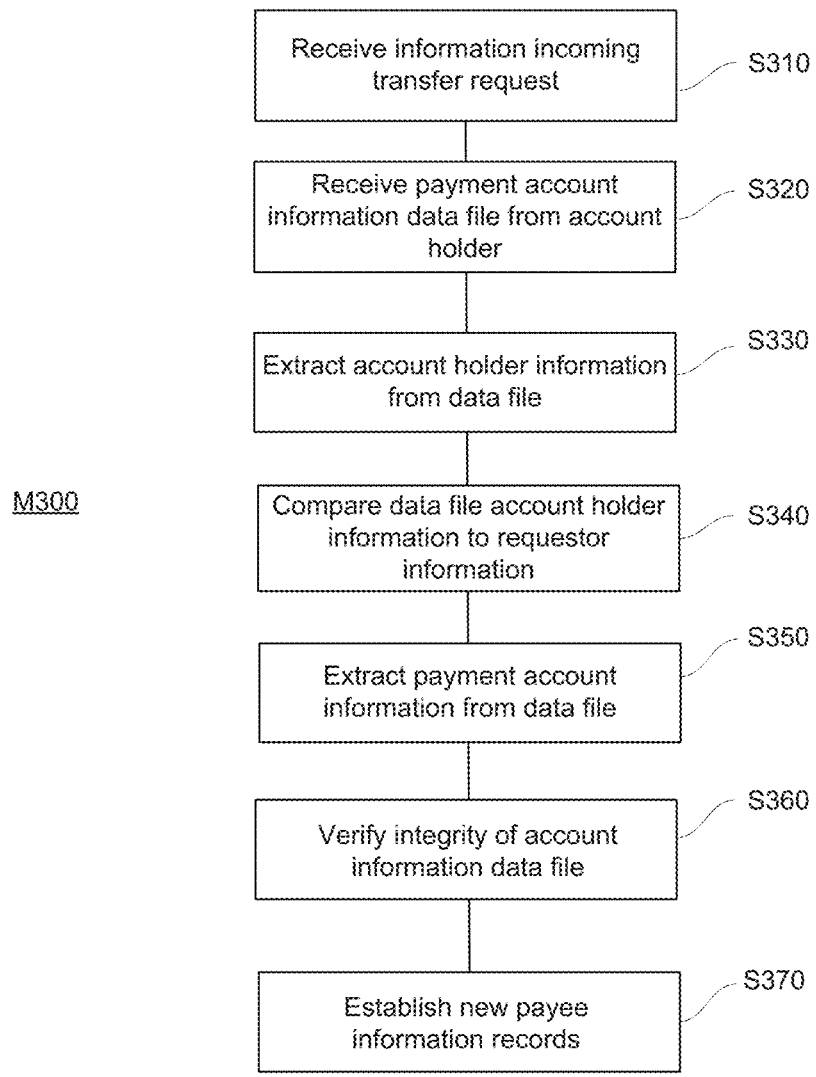
FIG. 8 is a flow diagram illustrating a method of transferring payment account information into a financial account provider according to an embodiment of the invention.

FIG. 8 illustrates an exemplary method M300 of transferring in payment account information according to an embodiment of the invention. In this method M300, the user is an account holder who has obtained a payment account information data file from a first account with a first account provider and wishes to have the payment information from this file associated with a second account with a second account provider. The actions of the method may be carried out by an account information processing server or system associated with the second account provider.

At S310 of the method M300, the account information processing server of the second account provider receives a request to transfer in payment information and associate it with an account. The request is typically received from a user device of an account holder associated with the account. In some embodiments, the transfer-in request may be received as part of an interactive session between the user device and the account information processing server. In establishing this session or, in some cases, after receiving a standalone request, the account information processing server may request and, receive from the user device, user and/or user device, authentication information that the server may use to verify that the user and/or user device are associated with the second bank account and are authorized to make the change request. In some embodiments, the authentication information may be or include a user name and password combination submitted as part of a login procedure. In some embodiments, the authentication information may be provided in response to a prompt transmitted to the user device by the account information processing server. In some embodiments, multi-factor authentication information may be required. This may require, in some cases, that the user device provide authentication information that includes information encrypted using previously assigned device- or user-specific encryption keys. In some such embodiments, the authentication information may be or include information encrypted using an encryption key specific to a transaction card associated with the second account.

At S320, the account information processing server receives the payment account information data file from the account holder user device. The data file may be received along with the transfer-in request or as part of a subsequent interactive communication session between the user device and the processing server. In some cases, the account information processing server may transmit a response to the transfer-in request in which it instructs the account holder to transmit the payment account information data file.

At S330, the account information processing server may extract account holder information (if included) from the data file. As previously described, this information may include name, email address, physical address, phone number, employer, social security number or other unique identifier as known to the transferring financial account provider. At S340, the account holder information from the data file is compared to similar information for the requestor as known to the second financial account provider. Matching of this information assures the second account provider that the information is being associated with the proper account holder. It also serves to legitimize the authorization of the requestor.

At S350, the account information processing server extracts the payment account information from the payment account information data file. As previously discussed, this is facilitated by the use of a standardized data format agreed upon between the account providers. At S360, the processing server may optionally verify the integrity of the account information data file using a security parameter extracted from the data file. This may include determining a new security parameter value by applying the verification algorithm to the information in the data file and comparing the new parameter to the stored parameter. Verifying that the calculated parameter matches the stored parameter provides confirmation to the second account provider that the information in the data file has not been altered.

It will be understood that the method M300 may also include decryption of encrypted information included in the payment account information data file.

Using the agreed upon standardized fields, the account information processing server can generate a new payee information record for each payee at S370. The payee information record may identify the payee and may include all information needed to process a future electronic payment transaction substantially as previously accomplished by the first account provider for the first account. The record may then be stored in a payment information data base where it can be accessed for processing future payment transactions. In some embodiments, the account information processing server may condition the generation of new payee records on additional account validation criteria being met. This may be particularly desirable when the account with the second provider is a new account. Such validation criteria may include a requirement that a minimum time interval has passed since the opening of the account and/or the transfer of the payment information. In some embodiments, the criteria could include a requirement that at least one electronic payment be made from the account within a minimum time interval (e.g., 30 days) after the payment information transfer.

Figure 9:
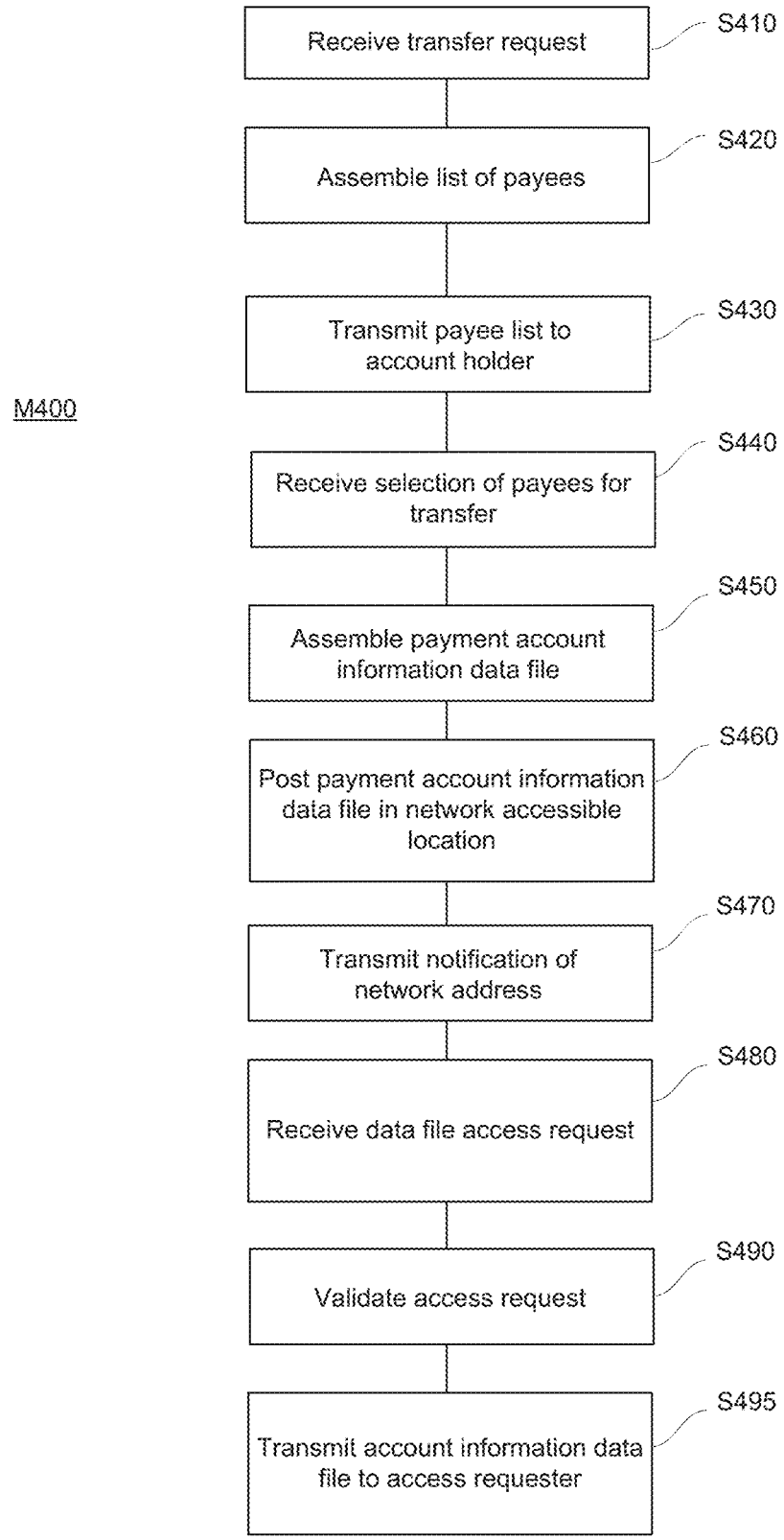
FIG. 9 is a flow diagram illustrating a method of transferring payment account information according to an embodiment of the invention.

FIG. 9 illustrates another exemplary method M400 of transferring payment account information according to an embodiment of the invention. Once again, the user is an account holder who wishes to transfer payment account information from a first with a first financial account provider to a second account with a second financial account provider. The actions of the method may be carried out by an account information processing server or system associated with the first financial account provider.

The initial steps of the method M400 may be substantially similar to those of the methods M100 and M200. At S410 of the method M400, a payment information transfer request is received by the account information processing server from a user device associated with an account holder and a first provider account. At S420, the account information processing server assembles a list of one or more payees and at S430 it transmits the payee list to the user device for display to the account holder. At S440, the processing server receives the payee selection from the user device and at S450 assembles a payment account information data file in a standardized format as previously describes. As before, assembly of the data file may include application of security measures to inhibit or prevent unauthorized access to the payment information. Such measures may include encryption of some or all of the payment and/or account holder information data as previously described.

At S460, the account information processing server posts the account information data file to a network-accessible location having an associated network address. At S470, the processing server transmits a notification to one or both of the account holder user device and the transferee processing system identifying the network address. This notification may include instructions and or authorization requirements for accessing the data file. The notification may also note that the data file will only be available for access at the network address for a limited time period. In some cases, the actions associated with transmitting the account information data file may be carried out in response to an access request received from the user device or the transferee processing system.

At S480, a data file access request is received via the network address. The requester may be any authorized entity that can meet the validation requirements. Typically, the access request will be received from the account holder's user device or the account information processing server of the second account provider. The access request may include required access information such as a token associated with the account or other required authorization/validation information. At S490, the access request is validated using the access information and, if validation confirmed, the account information data file is transmitted to the requester at S495.

The methods and systems of the present invention provide a significant improvement in security and system efficiency in transferring payment account information. This, in turn, may significantly reduce the negative association that account holders may have in relation to changing from one bank to another.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. An automated method using an account information processing server for transferring payee payment account information associated with electronic payments of account holder accounts from a first account provider to a second account provider, wherein the account information processing server comprises a communication interface in communication with one or more networks, a user authentication processor, a payment information selection processor, a payment information assembly processor and a payment information transmission processor, the method comprising:

receiving, by the user authentication processor of the account information processing server from an account holder device of an account holder via the communication interface and a first network of the one or more networks, a payment information transfer request to transfer payment information from the first account provider to the second account provider, wherein the first account provider is associated with the account information processing server and the second account provider is associated with an information processing server, and wherein the account holder device is associated with an account of the account holder provided by the first account provider;

obtaining, by the payment information selection processor of the account information processing server from a payment transaction information database, electronic payment transaction information associated with electronic payments made from the account;

assembling, by the payment information selection processor of the account information processing server, a list of one or more payees associated with the electronic payments, wherein each of the one or more payees has received an electronic payment made from the account;

transmitting, by the payment information selection processor of the account information processing server via the communication interface and the first network, the assembled list of one or more payees to the account holder device for display to the account holder;

receiving, by the payment information selection processor of the account information processing server from the account holder device via the communication interface and the first network, a user selection of at least one selected payee from the list of one or more payees;

receiving, by the payment information assembly processor from the payment information selection processor, the user selection of at least one selected payee from the list of one or more payees;

assembling, by the payment information assembly processor of the account information processing server, a payment account information data file using a predetermined data format, wherein the payment account information data file comprises payment account information of the at least one selected payee in the predetermined data format, wherein the payment account information of the at least one selected payee comprises an identification of the at least one selected payee for making payment to the at least one selected payee;

receiving, by the payment information transmission processor of the account information processing server, the payment account data file from the payment information assembly processor; and transmitting, by the payment information transmission processor via the communication interface and a second network of the one or more networks, the payment account information data file to at least one of the account holder device and the information processing server of the second account provider.

2. The method of claim 1, further comprising:
storing, by the account information processing server, the payment account information data file in a network-accessible location; and
transmitting, by the payment information transmission processor of the account information processing server, a notification to the account holder device, the notification including a network address associated with the network-accessible location for accessing the payment account information data file.

3. The method of claim 2, further comprising:
receiving, by the account information processing server from the at least one of the account holder device and the information processing system of the second account provider, an access request to access the payment account information data file, wherein the access request comprises the network address,
wherein the transmitting the payment account information data file further comprises in response to receiving the access request, transmitting the payment account information data file to the at least one of the account holder device and the information processing server of the second account provider by retrieving the payment account information data file from the network-accessible location.

4. The method of claim 2, wherein the payment account information data file is accessible via the network-accessible location for a limited time period.

5. The method of claim 1, wherein the payment account information of the at least one selected payee is for processing a payment to the at least one selected payee via ACH transfer.

6. The method of claim 5, wherein the payment account information includes regular payment amount and timing information.

7. The method of claim 1, wherein the payment account information of the at least one selected payee is for processing a wire transfer to the at least one selected payee.

8. The method of claim 1, wherein the payment account information data file includes account holder information.

9. The method of claim 8, wherein the account holder information includes at least one of the set consisting of a physical address, an email address, a phone number, and some or all of an identifier unique to the account holder.

10. The method of claim 1, further comprising:
generating, by the account information processing server, a security parameter usable to verify that information in the payment account information data file has not been altered; and
including, by the account information processing server, the security parameter in the payment account information data file.

11. The method of claim 1, further comprising:
encrypting, by the payment information assembly processor, at least a portion of the payment account information data file using at least one encryption key accessible by the second account provider.

12. An account information processing server for transferring payee payment account information associated with payment transactions of account holder accounts from a first service provider to a second service provider, the account information processing server comprising:
a communication interface in communication with one or more networks;
a user authentication processor;
a payment information selection processor;
a payment information assembly processor;
a payment information transmission processor;
wherein the user authentication processor is configured to:
receive, from an account holder device of an account holder via the communication interface and a first network of the one or more networks, a payment transfer request to transfer payment information from the first account provider to the second account provider, wherein the first account provider is associated with the account information processing server and the second account provider is associated with an information processing server, and wherein the account holder device is associated with an account of the account holder provided by the first account provider; and
verify the authenticity of the payment information transfer request;
wherein the payment information selection processor is configured to, in response to verification of the authenticity by the user authentication processor;
obtain, from a payment transaction information database, electronic payment transaction information associated with electronic payments made from the account;
assemble, using the electronic payment transaction information, a list of one or more payees associated with the electronic payments, wherein each of the one or more payees has received an electronic payment made from the account;
transmit, to the account holder device via the communication interface and the first network, the assembled list of one or more payees to the account holder device for display to the account holder;
receive, from the account holder device via the communication interface and the first network, a user selection of at least one selected payee from the list of one or more payees;
wherein the payment information assembly processor is configured to:
receive the user selection of the at least one selected payee from the list of one or more payees from the payment information selection processor;
assemble, using a predetermined data format, a payment account information data file comprising payment account information of the at least one selected payee in the predetermined data format, wherein the payment account information of the at least one selected payee comprises an identification of the at least one selected payee for making payment to the at least one selected payee;
wherein the payment information transmission processor is configured to:

receive the payment account information data file from the payment information assembly processor; and transmit via the communication interface and a second network of the one or more networks, the payment account information data file to at least one of the account holder device and the information processing server of the second account provider.

13. The account information processing server of claim 12, wherein the obtaining the electronic payment transaction information associated with the electronic payments made from the account further comprises:

reviewing transaction information for a plurality of transactions associated with the account;

identifying transactions from the plurality of the transactions in which electronic payments were made from the account; and for each of the identified transactions, determining payment account information associated with each of the electronic payments, wherein the payment account information comprises identification of a transaction payee.

14. The account information processing server of claim 13, wherein the plurality of transactions includes at least one payment via ACH transfer.

15. The account information processing server of claim 13, wherein the plurality of transactions includes at least one wire transfer.

16. The account information processing server of claim 12, wherein the payment account information data file includes account holder information.

17. The account information processing server of claim 12, wherein the payment information assembly processor is further configured to encrypt at least a portion of the payment account information data file.

* * * * *